United States Patent
Stevenson et al.

(10) Patent No.: US 11,473,161 B2
(45) Date of Patent: Oct. 18, 2022

(54) APPARATUS AND METHODS FOR HEATING AND QUENCHING TUBULAR MEMBERS

(71) Applicant: GRANT PRIDECO, L.P., Houston, TX (US)

(72) Inventors: Daryl Stevenson, Cypress, TX (US); David Charles Lynch, Medina, OH (US); Christopher Alan Conrey, College Station, TX (US); Michael Wade McCain, Conroe, TX (US)

(73) Assignee: GRANT PRIDECO, L.P., Houston, TX (US)

( * ) Notice: Subject to any disclaimer, the term of this patent is extended or adjusted under 35 U.S.C. 154(b) by 0 days.

(21) Appl. No.: 16/760,973

(22) PCT Filed: Nov. 21, 2018

(86) PCT No.: PCT/US2018/062246
§ 371 (c)(1),
(2) Date: May 1, 2020

(87) PCT Pub. No.: WO2019/104168
PCT Pub. Date: May 31, 2019

(65) Prior Publication Data
US 2020/0299794 A1    Sep. 24, 2020

Related U.S. Application Data

(60) Provisional application No. 62/590,410, filed on Nov. 24, 2017.

(51) Int. Cl.
*C21D 9/08* (2006.01)
*C21D 9/50* (2006.01)
(Continued)

(52) U.S. Cl.
CPC ............... *C21D 9/085* (2013.01); *C21D 1/42* (2013.01); *C21D 1/63* (2013.01); *C21D 9/505* (2013.01);
(Continued)

(58) Field of Classification Search
None
See application file for complete search history.

(56) References Cited

U.S. PATENT DOCUMENTS 2,542,237 A    2/1951   Dewey
3,976,520 A    8/1976   Reinke et al.
(Continued)

FOREIGN PATENT DOCUMENTS

CN    102719631 A    10/2012
CN    202519304 U    11/2012
(Continued)

OTHER PUBLICATIONS

JP2015108188A translation (Year: 2021).*
(Continued)

*Primary Examiner* — Scott R Kastler
(74) *Attorney, Agent, or Firm* — Conley Rose, P.C.

(57) ABSTRACT

A device for heating and quenching a tubular member has a central axis. The device includes a first quenching ring, a second quenching ring axially spaced from the first quenching ring, and a heating ring axially positioned between the first quenching ring and the second quenching ring. Each quenching ring and the heating ring is configured to receive the tubular member. The heating ring is fixably coupled to the first quenching ring and the second quenching ring. The heating ring includes an induction coil configured to heat an annular target zone along the tubular member. The first quenching ring is configured to deliver a first quenching fluid to the target zone and a first annular heat affected zone
(Continued)

along the tubular member, and the second quenching ring is configured to deliver a second quenching fluid to the target zone and a second annular heat affected zone along the tubular member.

7 Claims, 7 Drawing Sheets

(51) Int. Cl.
  *H05B 6/10* (2006.01)
  *C21D 1/42* (2006.01)
  *C21D 1/63* (2006.01)
  *H05B 6/44* (2006.01)
(52) U.S. Cl.
  CPC .................. *H05B 6/10* (2013.01); *H05B 6/44* (2013.01); *C21D 2211/001* (2013.01)

(56) References Cited

U.S. PATENT DOCUMENTS

| | | | |
|---|---|---|---|
| 3,997,374 A | 12/1976 | Dill et al. | |
| 4,168,190 A | 9/1979 | Eguchi et al. | |
| 4,305,574 A | 12/1981 | Amend | |
| 4,845,328 A | 7/1989 | Storm et al. | |
| 5,247,145 A | 9/1993 | Storm et al. | |
| 5,360,963 A | 11/1994 | Storm et al. | |
| 5,488,219 A | 1/1996 | Tanaka et al. | |
| 6,013,904 A | 1/2000 | Storm et al. | |
| 6,024,913 A | 2/2000 | Ogawa et al. | |
| 7,253,381 B2 | 8/2007 | Loveless et al. | |
| 7,998,282 B2 | 8/2011 | Taniguchi et al. | |
| 8,501,083 B2 | 8/2013 | Nallen et al. | |
| 9,534,267 B2 | 1/2017 | Tanaka et al. | |
| 2007/0181234 A1* | 8/2007 | Nallen | C21D 1/62 148/660 |
| 2010/0155390 A1 | 6/2010 | Hirota | |
| 2013/0312879 A1* | 11/2013 | Nallen | C21D 1/62 148/559 |
| 2016/0376678 A1 | 12/2016 | Wagner et al. | |

FOREIGN PATENT DOCUMENTS

| | | |
|---|---|---|
| CN | 202688392 U | 1/2013 |
| CN | 202808875 U | 3/2013 |
| CN | 203048993 U | 7/2013 |
| CN | 103451384 A | 12/2013 |
| CN | 103589846 A | 2/2014 |
| CN | 203890388 U | 10/2014 |
| CN | 104232873 A | 12/2014 |
| CN | 105624373 A | 6/2016 |
| CN | 205933888 U | 2/2017 |
| GB | 2026044 A | 1/1980 |
| JP | 2007262549 A | 10/2007 |
| JP | 2010222672 A | 10/2010 |
| JP | 2015108188 A | 6/2015 |
| JP | 2015108188 A * | 6/2015 |
| WO | 2014027463 A1 | 2/2014 |

OTHER PUBLICATIONS

Extended European Search Report dated Jul. 13, 2021, for European Application No. 18881424.8 (12 p.).
European Search Report dated Mar. 26, 2021, for European Application No. 18881424.8 (13 p.).
PCT/US2018/062246 International Search Report and Written Opinion dated Jan. 29, 2019 (17 p.).
Induction Quenching with Custom-Design Inductor, United Induction Heating Machine Limited, 2000-2014 (2 p.).

* cited by examiner

APPARATUS AND METHODS FOR HEATING AND QUENCHING TUBULAR MEMBERS

CROSS-REFERENCE TO RELATED APPLICATIONS

This application is a 35 U.S.C. § 371 national stage application of PCT/US2018/062246 filed Nov. 21, 2018, and entitled "Apparatus and Methods for Heating and Quenching Tubular Members," which claims benefit of U.S. provisional patent application Ser. No. 62/590,410 filed Nov. 24, 2017, and entitled "Apparatus and Methods for Heating and Quenching Tubular Members," each of which is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure relates generally to apparatus and methods for heating and quenching objects. More particularly, it relates to apparatus and methods for heating and quenching a welded connection along a tubular.

Background

Metal objects are commonly heat treated to achieve particular mechanical properties related to strength, surface hardness, ductility, and strain relief. Heat treatment usually involves the heating of the metal object to an extreme. Quenching the metal object to rapidly reduce its temperature after the heat treatment may also be used to obtain certain mechanical properties. For example, steel can be hardened by heating the steel to the austenite phase and then quenching it to convert its microstructure to the martensitic phase.

BRIEF SUMMARY OF THE DISCLOSURE

Embodiments of devices for heating and quenching tubular members are disclosed herein. In one embodiment, the device has a central axis and comprises a first quenching ring disposed about the central axis. The first quenching ring is configured to receive the tubular member and comprises a first annular body having a radially inner side, a radially outer side, a first inner cavity radially positioned between the radially inner side and the radially outer side of the first annular body. The first quenching ring also comprises a first fluid inlet in fluid communication with the first inner cavity. In addition, the first quenching ring comprises a first plurality of circumferentially-spaced fluid outlets extending from the first inner cavity to the radially inner side of the first annular body. The device also comprises a second quenching ring disposed about the central axis and configured to receive the tubular member. The second quenching ring is axially spaced from the first quenching ring and comprises a second annular body having a radially inner side, a radially outer side, and a second inner cavity radially positioned between the radially inner side and the radially outer side of the second annular body. The second quenching ring also comprises a second fluid inlet in fluid communication with the second inner cavity. In addition, the second quenching ring comprises a second plurality of circumferentially-spaced fluid outlets extending from the second inner cavity to the radially inner side of the second annular body. Still further, the device comprises a heating ring disposed about the central axis and configured to receive the tubular member. The heating ring is axially positioned between the first quenching ring and the second quenching ring. The heating ring is fixably coupled to the first quenching ring and the second quenching ring. The heating ring comprises an induction coil configured to heat an annular target zone along the tubular member. The first plurality of circumferentially-spaced fluid outlets are configured to deliver a first quenching fluid to the target zone and a first annular heat affected zone extending axially from the target zone along the tubular member. The second plurality of circumferentially-spaced fluid outlets are configured to deliver a second quenching fluid to the target zone and a second annular heat affected zone extending axially from the target zone along the tubular member.

Embodiments of methods for heating and quenching a welded joint along a tubular member having a central axis are disclosed herein. In one embodiment, a method comprises (a) positioning an inductive coil about the tubular member and axially aligning the inductive heating coil and the welded joint. Further, the method comprises (b) heating the welded joint with the inductive coil after (a) while maintaining the axial alignment of the welded joint and the inductive coil. Further, the method comprises (c) after (b), simultaneously quenching a first annular heat affected zone along the tubular member on a first lateral side of the welded joint with a first quench fluid and quenching a second annular heat affected zone along the tubular member on a second lateral side of the welded joint that is opposite the first lateral side of the weld with a second quench fluid while maintaining the axial alignment of the welded joint and the inductive coil.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of the disclosed exemplary embodiments, reference will now be made to the accompanying drawings, wherein.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not necessarily drawn to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B."

The terms "axial" and "axially" generally mean along a given axis, while the terms "radial" and "radially" generally mean perpendicular to the axis. For instance, an axial distance refers to a distance measured along or parallel to a given axis, and a radial distance means a distance measured perpendicular to the axis. As understood in the art, the use of the terms "parallel" and "perpendicular" may refer to precise or idealized conditions as well as to conditions in which the members may be generally parallel or generally perpendicular, respectively. Furthermore, any reference to a relative direction or relative position is made for purpose of clarity, with examples including "top," "bottom," "up," "upper," "upward," "down," "lower," "clockwise," "left," "leftward," "right," and "right-hand." For example, a relative direction or a relative position of an object or feature may pertain to the orientation as shown in a figure or as described. If the object or feature were viewed from another orientation or were implemented in another orientation, it may then be helpful to describe the direction or position using an alternate term. Claims are intended to cover all feasible orientations of an object or feature. Further, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

The use of ordinal numbers (i.e. first, second, third, etc.) to identify one or more components within a possible group of multiple similar components is done for convenience and clarity. Ordinal numbers that may be used outside the claims for members of a particular group of components may not necessarily correspond to the ordinal numbers used within the claims when referring to various members of the same group or a similar group of components.

DETAILED DESCRIPTION OF EXEMPLARY EMBODIMENTS

As previously described, steel objects may be subjected to heating and quenching to achieve desired mechanical properties. For example, a steel pipe (or region thereof) may be heat treated and quenched by positioning a heating coil about the region to be heat treated to raise the temperature of the region to an austenitizing temperature range generally from 1625 to 1675° F. Next, the steel pipe is removed from the heating coil and physically moved to a quenching station, where it is rapidly cooled with water or a liquid polymer. Moving the object from the heating coil to the quenching station, and associated time delay between heating and quenching, necessitates that the pipe be overheated to compensate for the loss of thermal energy as the pipe is moved—overheating ensures the region of the pipe is in the austenitizing temperature range after it is moved to the quenching station and quenching begins. Determining the degree to which to overheat the region and managing the transfer of the pipe from the heating coil to the quenching station (e.g., ensuring the pipe is moved with sufficient speed) introduce additional variables to monitor and control in the heating and quenching process. In addition, minor variations in overheating, pipe transfer speeds, etc. of different pipes can introduce variations in the final mechanical properties of those pipes.

The apparatuses and methods disclosed herein are intended to eliminate the need to move an object during heat treatment and subsequent quenching to reduce the complexity and variability of the heating and quenching process, and offer the potential for improved consistency in resulting mechanical properties across a plurality of objects being heat treated and quenched. Various embodiments of heat treating devices in accordance with the principles disclosed herein include a heating member to heat a target region of an object and a quenching device to simultaneously supply quenching fluid(s) to both sides of the target region immediately after heating. In the examples described herein, a heat treating device includes an annular heating member configured to circumferentially surround a target region on an elongate member that extends generally parallel to the central axis of the heating member. The heat treating device also includes first and second annular quenching devices axially spaced apart and located adjacent opposite ends of the heating member, and each configured to circumferentially surround the target region.

Figure 1:
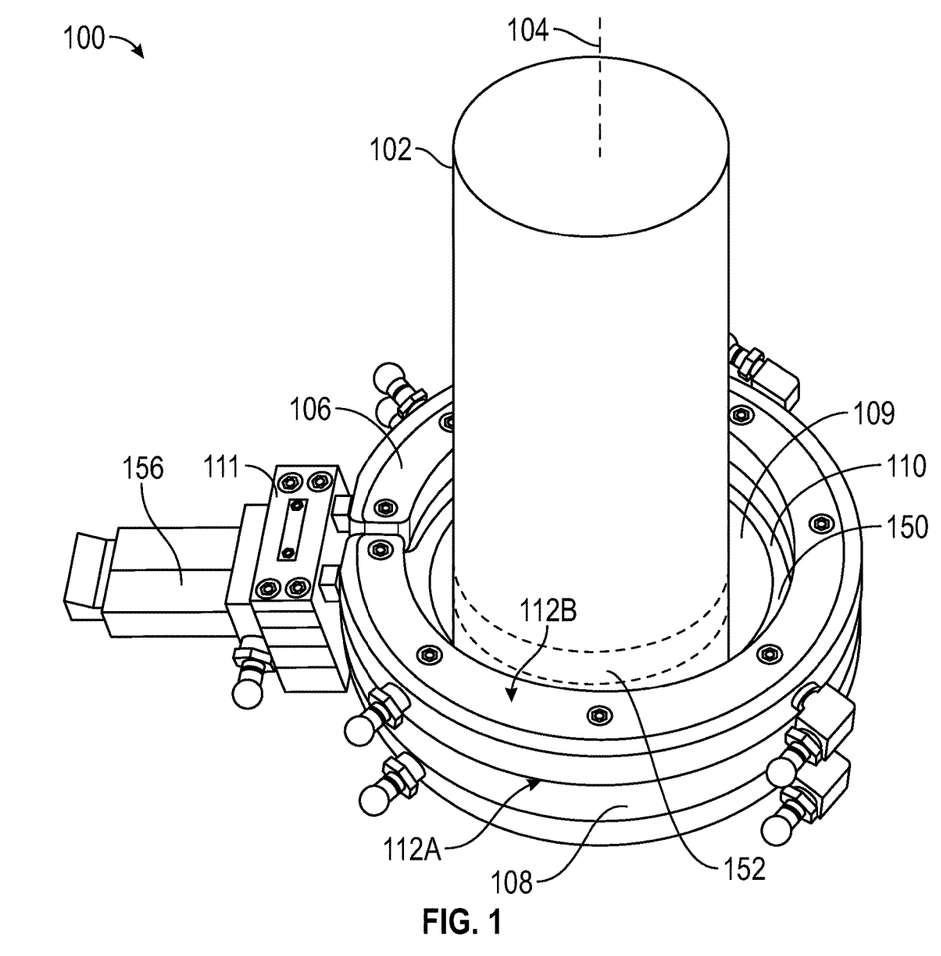
FIG. 1 is a perspective view of an embodiment of a heat treating device in accordance with the principles disclosed herein with a tubular member extending therethrough for heat treating and quenching.

Referring now to FIG. 1, an embodiment of heat treating device 100 for heating and quenching an object 102 is shown. In this embodiment, object 102 is an elongate tubular member, and more particularly, a pipe joint. Thus, object 102 may also be referred to herein as a tubular member or pipe joint with the understanding that device 100 can be used in connection with other objects. In FIG. 1, pipe joint 102 is shown extending through device 100 and with device 100 positioned to heat treat and quench a particular region of interest along pipe joint 102.

Referring still to FIG. 1, in this embodiment, device 100 includes a first annular quenching ring 106, a second annular quenching ring 108, a heating ring 110, and a mount 111. Rings 106, 108, 110 and mount 111 are fixably coupled together such that they do not move rotationally or translationally relative to each other. Quenching rings 106, 108, and heat ring 110 are coaxially aligned with and disposed about a central axis 104 of device 100. Heating ring 110 is axially positioned between quenching rings 106, 108, and thus, quenching rings 106, 108 are disposed on opposite sides of heating ring 110. Collectively, rings 106, 108, 110 define a through-passage 109 extending axially through device 100 and sized to receive pipe joint 102 therein. In this embodiment, mount 111 is a G10 Connector made of a high-pressure fiberglass laminate composite material and functions as an insulating block that simultaneously supports rings 106, 108, 110 and maintains the relative positions of rings 106, 108, 110 (e.g., maintains the axial spacing of rings 106, 108, 110).

Figure 2:
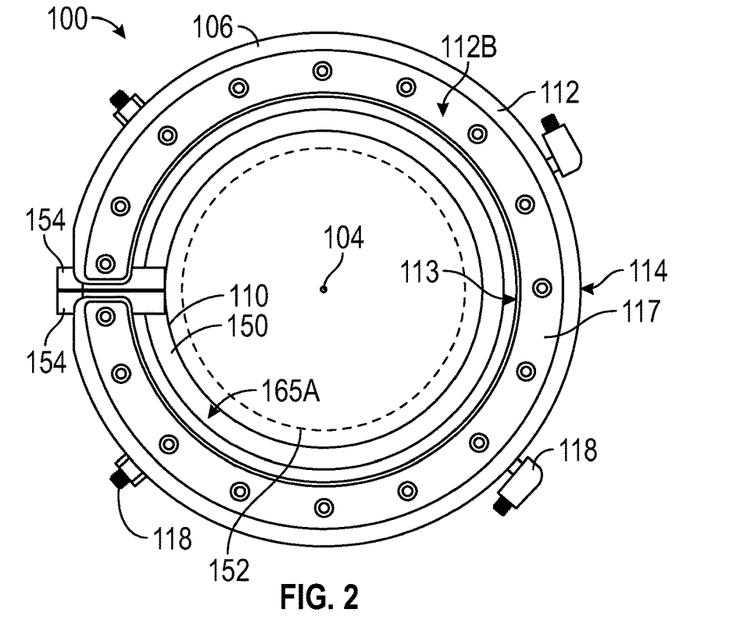
FIG. 2 is an end view of one of the quench rings of the heat treating device of FIG. 1.
Figure 3:
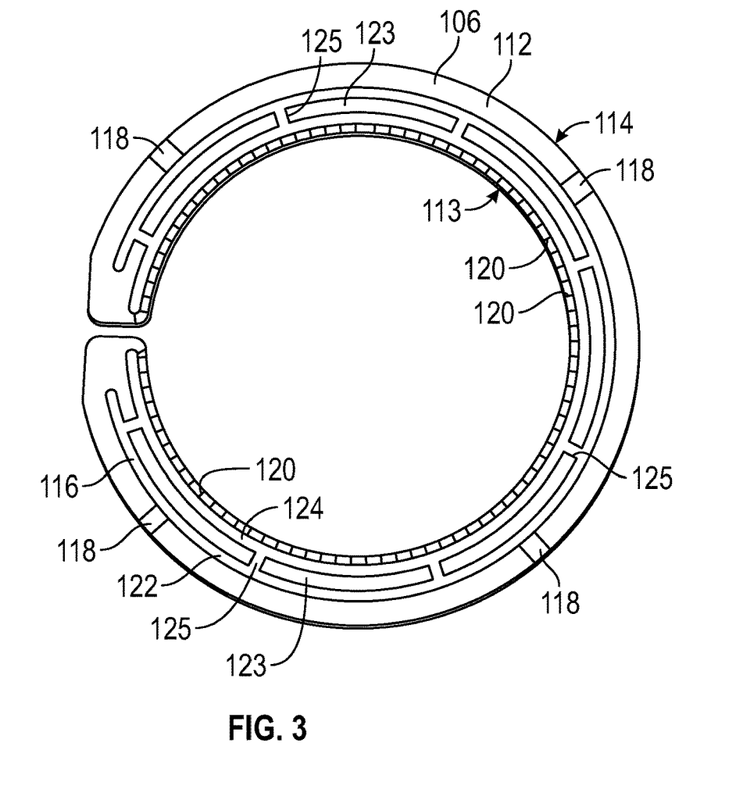
FIG. 3 is an end view of the quench ring of FIG. 2 with the cover plate removed.

Referring now to FIGS. 2 and 3, first annular quenching ring 106 will be described with the understanding that second annular quenching ring 108 is the same. As shown in FIGS. 2 and 3, quenching ring 106 includes an annular body 112 and an inner annular cavity 116 disposed within body 112. Body 112 has axially spaced opposite end faces or ends 112A, 112B, a radially inner side 113 extending axially between ends 112A, 112B, and a radially outer side 114 extending axially between ends 112A, 112B. Sides 113, 114 are generally cylindrical and radially spaced apart (relative to axis 104). Cavity 116 extends axially into body 112 from end 112B. An annular cover plate 117 (removed in FIG. 3) is sealingly attached to end 112B of body 112 to close off and cover cavity 116. Accordingly, cavity 116 is axially positioned between ends 112A, 112B and radially positioned between sides 113, 114.

Referring still to FIGS. 2 and 3, quenching ring 106 also includes a plurality of circumferentially spaced fluid inlets 118 extending radially from outer side 114 to cavity 116 and a plurality of uniformly circumferentially-spaced fluid outlets 120 extending radially from inner side 113 to cavity 116. Cavity 116 extends circumferentially within ring body 112, receives fluid from inlets 118, and supplies the fluids to outlets 120. Quenching ring 106, cavity 116, and outlets 120 each span substantially 360° about axis 104 to provide uniform quenching as will be described in more detail below. Although quenching ring 106 is shown with a single split or slit in this embodiment, in other embodiments, the quenching ring (e.g., quenching ring 106) is formed to span a continuous 360°. In embodiments described herein, quenching ring 106, cavity 116, and fluid outlets 120 span greater than or equate to 270° but less than 360°. Even in some of these embodiments, the flooding or spray pattern of fluid outlets 120 surround substantially 360° of passage 109 and/or object 102. In some embodiments, quenching ring 106, cavity 116, fluid outlets 120, or combinations thereof may be separated into discrete sections or pieces that, together, substantially surround passage 109 or object 102.

For example, a quench ring may be fabricated as a multiple circular segments that are mounted around passage 109. The same variations are applicable to quenching ring 108.

As best shown in FIG. 3, cavity 116 includes a radially outer annular channel 122, a radially inner annular channel 124 radially spaced from channel 122, and a plurality of circumferentially-spaced passages 125 extending radially from channel 122 to channel 124. A baffle 123 extends circumferentially between each pair of circumferentially adjacent passages 125 and is radially positioned between channels 122, 124. Inlets 118 intersect outer channel 122, and outlets 120 intersect inner channel 124. In this embodiment, body 112 includes eight radial passages 125.

Figure 4:
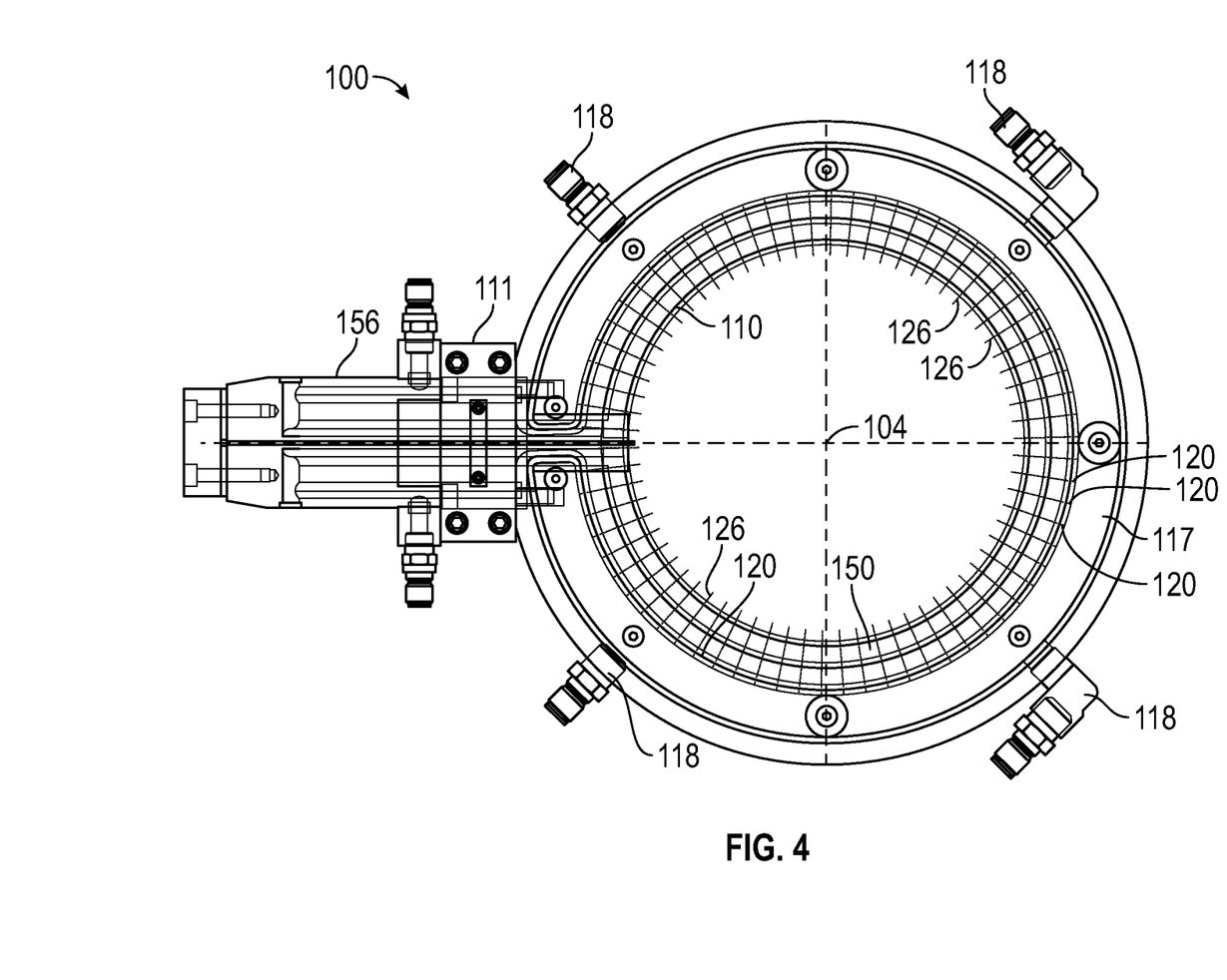
FIG. 4 is an end view of the heat treating device of FIG. 1.
Figure 5:
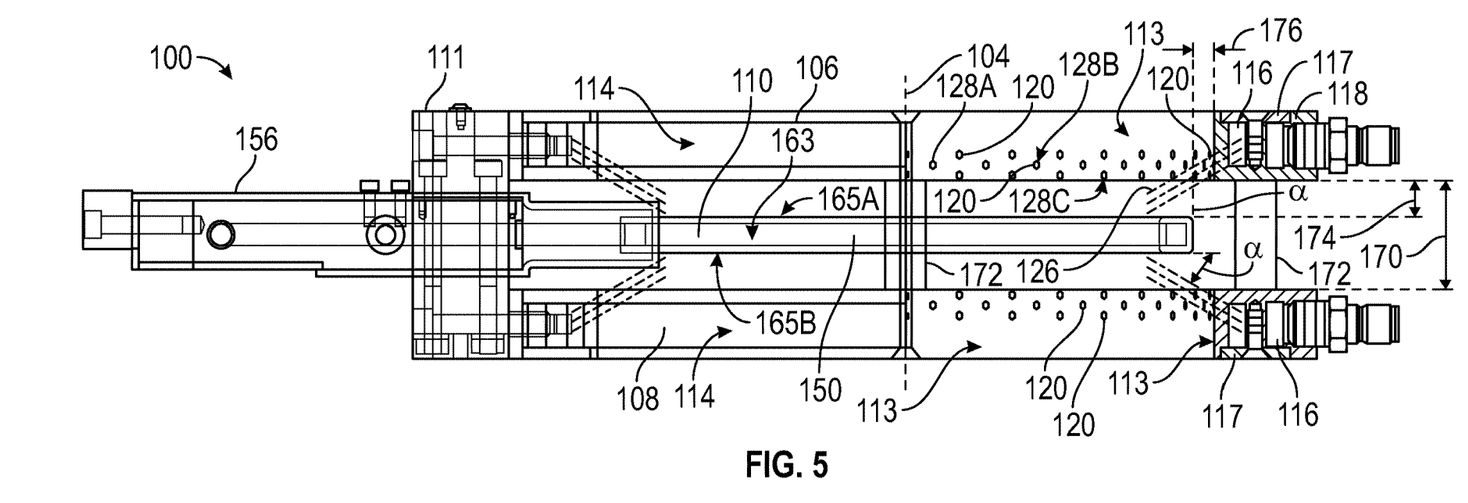
FIG. 5 is a side view of the heat treating device of FIG. 1.

In some embodiments, the plurality of outlets 120 include at least one-hundred outlets 120. As best shown in FIGS. 4 and 5, in this embodiment, quench ring 106 includes four fluid inlets 118 and one-hundred and seven (107) fluid outlets 120. In addition, each outlet 120 is a throughbore or hole having a diameter between 0.0625 and 0.1250 in., and in particular, a diameter of 0.094 in. In other embodiments, different numbers of inlets 118 and outlets 120 may be provided. Further, fluid outlets 120 may all have a same diameter or may be divided into groups that each have a selected diameter that differs from the other group or groups.

Referring still to FIGS. 4 and 5, in this embodiment, outlets 120 are arranged in a plurality of axially adjacent annular rows 128A, 128B, 128C. Within each row 128A, 128B, 128C, the radially inner ends of outlets 120 are disposed in a plane oriented perpendicular to axis 104 as indicated by the centerlines 126 of outlets 120 in end view. In addition, each outlet 120 is oriented at an acute angle α (FIG. 5) relative to a plane oriented perpendicular to axis 104. Each angle α is measured between the centerline 126 of the outlet 120 and a plane oriented perpendicular to axis 104. As shown in FIG. 5, outlets 120 in each quenching ring 106, 108 are oriented such that they are tilted or canted towards heating ring 110 moving radially inward from channel 124 to inner side 113. In embodiments described herein, the angle α of each outlet 120 in each row 128A, 128B, 128C is an acute angle less than or equal to 30°. In this embodiment, angle α of each outlet 120 in each row 128A, 128B, 128C is the same, and in particular, is 15°. In other embodiments, angle α of each outlet 120 in the same row 128A, 128B, 128C may be the same or different, angle α of each outlet 120 in the same row 128A, 128B, 128C may be the same with the angle α of each outlet 120 in different rows 128A, 128B, 128C being different.

Referring again to FIGS. 1 2, as previously described, heating ring 110 is fixably coupled to both quenching rings 106, 108. In this embodiment, heating ring 110 includes an annular body 150 comprising a single turn induction coil that induces thermal energy generation in an annular target zone 152 disposed therein. In general, the annular target zone 152 is the region within heating ring 110 that is heated by ring 110 to a desired temperature for heat treating. Although the actual location and size of target zone 152 can vary, in this embodiment, target zone 152 has a first axial end 206 located proximal first quenching ring 106 and a second axial end 208 located proximal second quenching ring 108.

Heating ring 110 also includes a pair of electrode members 154 extending radially outward from body 150 to a handle or heater mount 156 that is held within mount 111 radially adjacent bodies 112 of quenching rings 106, 108. In general, heater mount 156 couples heating ring 110 to an electrical power source that powers the induction coil of heating ring 110. In this embodiment, heater mount 156 is a "quick connect/disconnect" fitting.

As best shown in FIGS. 2 and 5, ring body 150 includes axially spaced end faces or ends 165A, 165B, a radially outer side extending axially between ends 165A, 165B, and a radially inner side extending axially between ends 165A, 165B. In this embodiment, annular body 150 of heating ring 110 spans substantially 360° as a single-turn induction coil. In other embodiments, heating ring 110 includes an induction coil that wraps more than 360° about passage 109 and object 102. In some embodiments, heating ring 110 is separated into discrete sections or pieces that, together, substantially surround passage 109 or object 102. In some embodiments, the heating ring (e.g., heating ring 110) and/or heating element (e.g., induction coil of body 150) span less than 270°. Although heat ring 110 comprises an induction coil in this embodiment, in other embodiments, the heat ring (e.g., heat ring 110) may rely on means other than induction heating to produce thermal energy such as, for example, radiant heating from a gas or an electric source.

Figure 6:
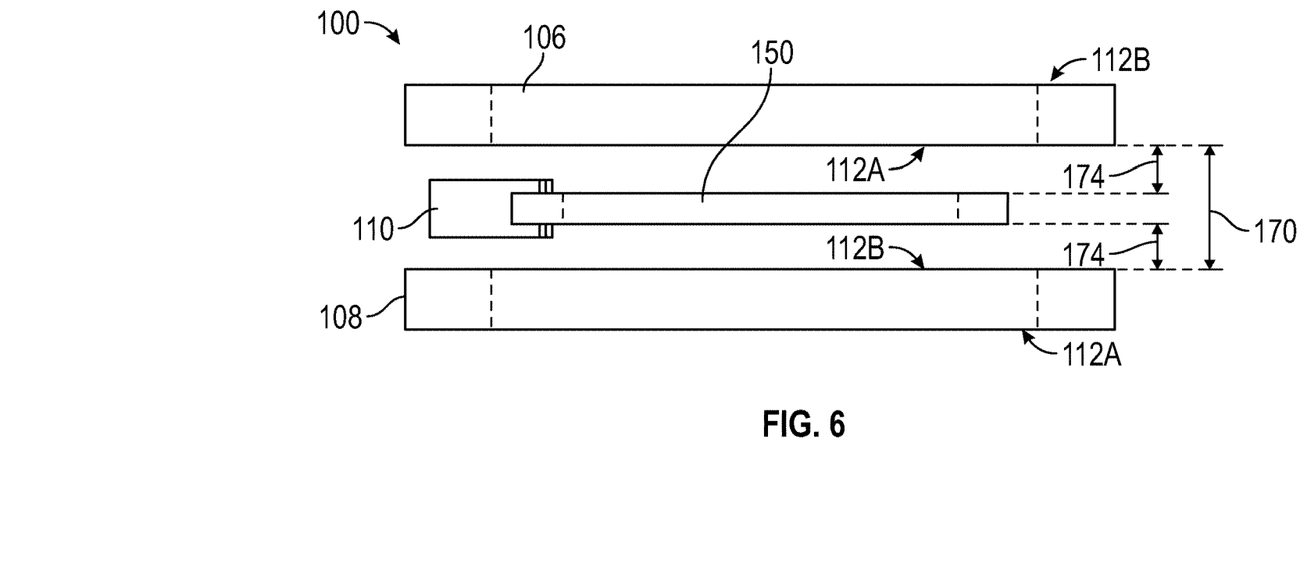
FIG. 6 is a schematic side view of the heat treating device of FIG. 1.

Referring now to FIGS. 5 and 6, end 112A of quenching ring 106 faces and is axially spaced apart from end 112B of quenching ring 108 by a distance 170 measured axially between ends 112A, 11B or rings 106, 108, respectively. As shown in FIG. 5, a plurality of circumferentially-spaced spacers 172 are axially positioned between rings 106, 108 and maintain the uniform axial spacing of rings 106, 108 by distance 170. Due to the generation of thermal energy by heating ring 110, spacers 172 are preferably made from a temperature resistant material, such as PEEK. Each end 165A, 165B of heating ring 110 is axially spaced from the axially adjacent end 112A, 112B of quenching ring 106, 108, respectively, by a distance 174 measured axially from end 165A, 165B to end 112A, 112B of ring 106, 108, respectively. The axial distances 174 define axial gaps between heating ring 110 and each quench ring 106, 108. In this embodiment, the outer diameter of heating ring body 150 is smaller than the inner diameter of each quenching ring 106, 108 a distance 176 measured radially from the radially outer side of body 150 to the radially inner side 113 of each ring 106, 108. Thus, as shown in FIGS. 2 and 4, body 150 is radially spaced apart from each ring 106, 108 in end view. In this embodiment, the inner diameter of heating ring body 150 is between 9.0 in. and 10.0 in., and more specifically, is 9.25 inches; the axial distance 170 between quench rings 106, 108 is between 1.50 in. and 2.50 in., and more specifically, is 2.00 inches; the axial distance 174 between heating ring 110 and each quench ring 106, 108 is between 0.50 in. and 1.0 in., and more specifically, is 11/16 inches; and the radial distance 176 is between 0.25 in. and 0.50 in., and more specifically, is 3/8 inches. In some embodiments, axial distance 170 is between 2.00 inches and 4.00 in. Other values for one or more of these several dimensions are possible in other embodiments.

Figure 7:
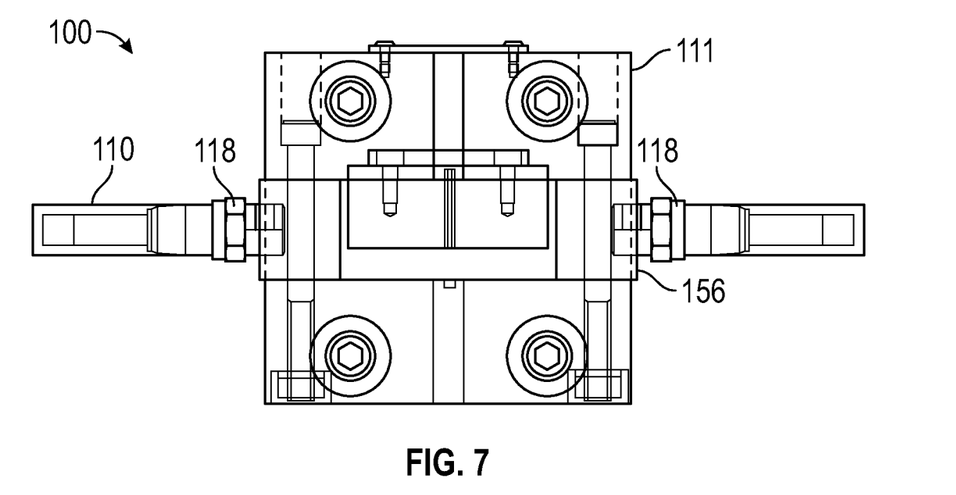
FIG. 7 is an end view of the heat treating device of FIG. 1.

FIG. 6 is a schematic side view of heat treating device 100 illustrating quenching rings 106, 108 and heating ring 110, as well as axial distances 170, 174. FIG. 7 is a side view of heating ring 110 coupled to heater mount 156 and mount 111, with two of the fluid inlets 118 being visible.

Figure 8:
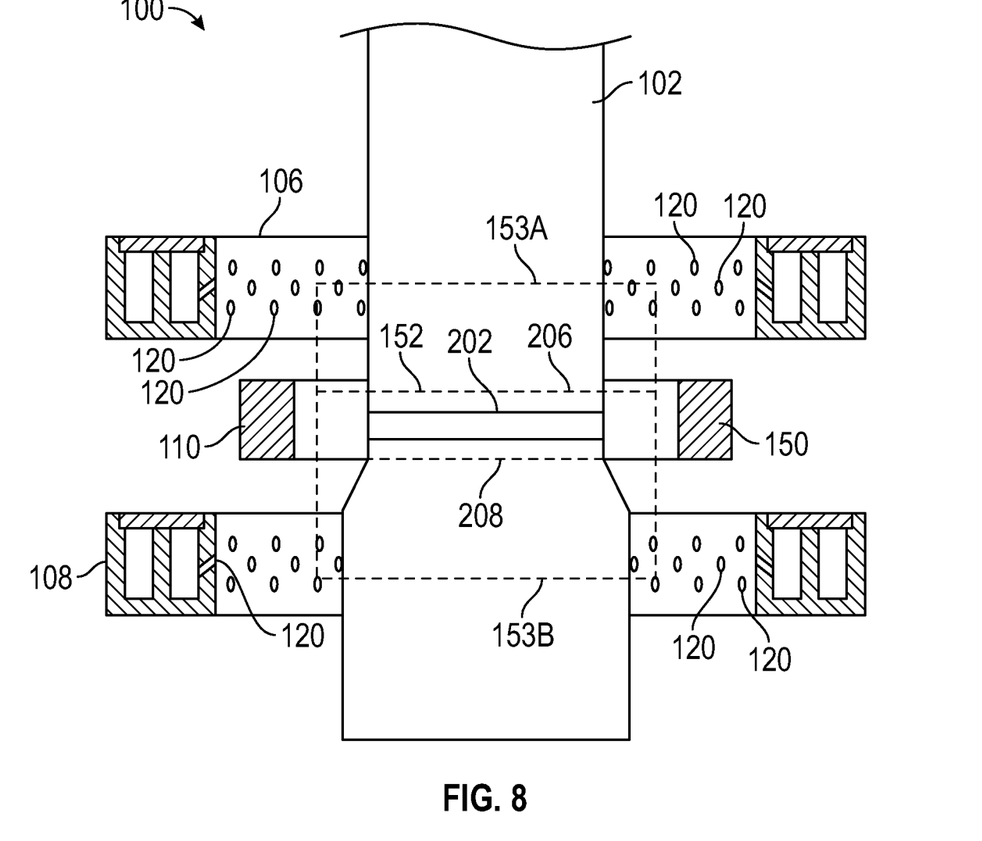
FIG. 8 is a schematic partial cross-sectional side view of the heat treating device of FIG. 1 with a tubular member received therein for heat treatment and quenching.

Referring now to FIG. 8, the operation of heat treating device 100 will now be described. Pipe joint 102 is received in passage 109 of device 100 such that pipe 102 extends through rings 106, 108, 110. In addition, pipe joint 102 is axially positioned with the portion of pipe joint 102 to be heat treated and quenched axially aligned with heating ring 110 and the corresponding target zone 152. In this embodiment, an annular welded joint or weld 202 of pipe joint 102 is to be heat treated and quenched with device 100, and thus, weld 202 is disposed within heating ring 110 between ends 206, 207 of annular target zone 152.

Next, power is supplied to heating ring 110 to induce the generation of thermal energy within target zone 152 and the portion of pipe joint 102 (e.g., weld 202) disposed therein. When heated, the portion of pipe 102 within target zone 152 is anticipated to experience a temperature gradient, with the temperature being greatest midway between ends 206, 208 and slightly decreasing moving axially towards each end 206, 2018. During heating operations, the entirety of target zone 152 on pipe 102 reaches a temperature within a targeted temperature range, which may result in some portions of zone 152 reaching and/or exceed the target temperature due to a temperature gradient. In some examples, the entirety of target zone 152 on pipe 102 is within the targeted temperature range when heating is completed, and no portion exceeds it. Based on the amount of time allowed for heating or other factors, the entire wall thickness of the target zone of pipe 102 may be heated to the target temperature, or a fractional thickness of the target zone of pipe 102 may be heated to the target temperature. If the material of pipe 102 is iron or a type of steel, as examples, the target temperature range may span temperatures that cause austenite to form within the material. In general, such temperature range may be referred to herein as an austenitizing temperature range, and a temperature in that range may be referred to herein as an austenitizing temperature. In some embodiments, the targeted temperature is an austenitizing temperature range of 1625 to 1675° F. In other embodiments, a different targeted temperature range is selected to achieve austenitizing or a different heat treating result.

Referring still to FIG. 8, heat affected zones 153A, 153B extend axially from weld 202 along pipe joint 102. In particular, heat affected zone 153A extends axially from weld 202 to quenching ring 106, and heat affected zone 153B extends axially from weld 202 to quenching ring 108. In general, the portion of pipe 102 within heat affected zones 153A, 153B receives thermal energy via conduction from target zone 152. The specific size, geometry, and position of the heat affected zones 153A, 153B will depend on a variety of factors including, without limitation, the geometry of heat ring 110, the radial distance between heat ring 110 and pipe 102, and the thermal energy output of heat ring 110.

Fluid outlets 120 of rings 106, 108 are positioned and oriented to provide quenching fluid to zones 152, 153A, 153B. First quenching ring 106 is axially spaced from first end 206 of target zone 152. However, fluid outlets 120 of quenching ring 106 are angled and directed toward zones 152, 153A, thereby enabling fluid outlets 120 of ring 106 to deliver a first quenching fluid to both target zone 152 and heat affected zone 153A. In addition, second quenching ring 108 is axially spaced from second end 208 of target zone 152. However, fluid outlets 120 of quenching ring 108 are angled and directed toward zones 152, 153B, thereby enabling fluid outlets 120 of ring 108 to deliver a second quenching fluid to both target zone 152 and heat affected zone 153B. During heating and quenching, pipe 102 is translationally and rotationally stationary relative to device 100 (with weld 202 axially aligned with target zone 152).

In some embodiments, the same quenching fluid is supplied to both quenching rings 106, 108 (e.g., the second quenching fluid is the same as the first quenching fluid). In general, the first or second quenching fluid may be any suitable quenching fluid known in the art including, without limitation, water, air, nitrogen, one or more oil(s), a polymer, or combinations thereof.

In embodiments described herein, the quantity, size, position, and orientation of outlets 120, along with the pressure or flow rate of quenching fluid, are arranged to flood the zones 152, 153A, 153B around the entire circumference of pipe 102 with quenching fluid as opposed to spraying impacting pipe 102. With flooding, the streams of quenching fluid exiting outlets 120 overlap at zones 152, 153A, 153B to immerse the entire outer circumference of pipe 102 along zones 152, 153A, 153B in the quenching fluid. In contrast, with spraying, the quenching fluid mixes with air as it is directed to the target body. Other factors, such as fluid viscosity or surface tension, can also influence the wetting behavior of the quenching fluid during delivery. Such flooding enables the quenching fluid(s) to simultaneously contact the entire outer surface of pipe 102 within zones 152, 153A, 153B with the quenching fluid(s). To induce flooding, the pressure drop of the quench fluid(s) as it passes through outlets 120 of quenching rings 106, 108 may be maintained sufficiently lower to avoid spraying of streams of quenching fluid(s).

In embodiments described hereinabove, device 100 includes two quenching rings 106, 108 disposed on opposite sides heating ring 110 and weld 202 to enable device 100 to heat target zone 152 (and weld 202 therein) to the target temperature, and then immediately quench target zone 152 and heat affected zones 153A, 153B without moving pipe 102 or device 100. As a result device 100 can heat and quench more efficiently than conventional processes, potentially reducing the amount of energy consumed and/or the amount of time required for the heating and quenching process. For example, pipe 102 can be heated to a target temperature or range of temperatures that lie within an austenitizing temperature range or another range of values without the overheating, which is commonly done to compensate for the heat loss that occurs when moving a tubular member from heating location to a quenching location in conventional processes. The inclusion of two quenching rings 106, 108 disposed one opposite sides of the heated target zone 152 also offers the potential to quench zones 152, 153A, 153б more uniformly and quickly than conventional heat treating devices.

Figure 9:
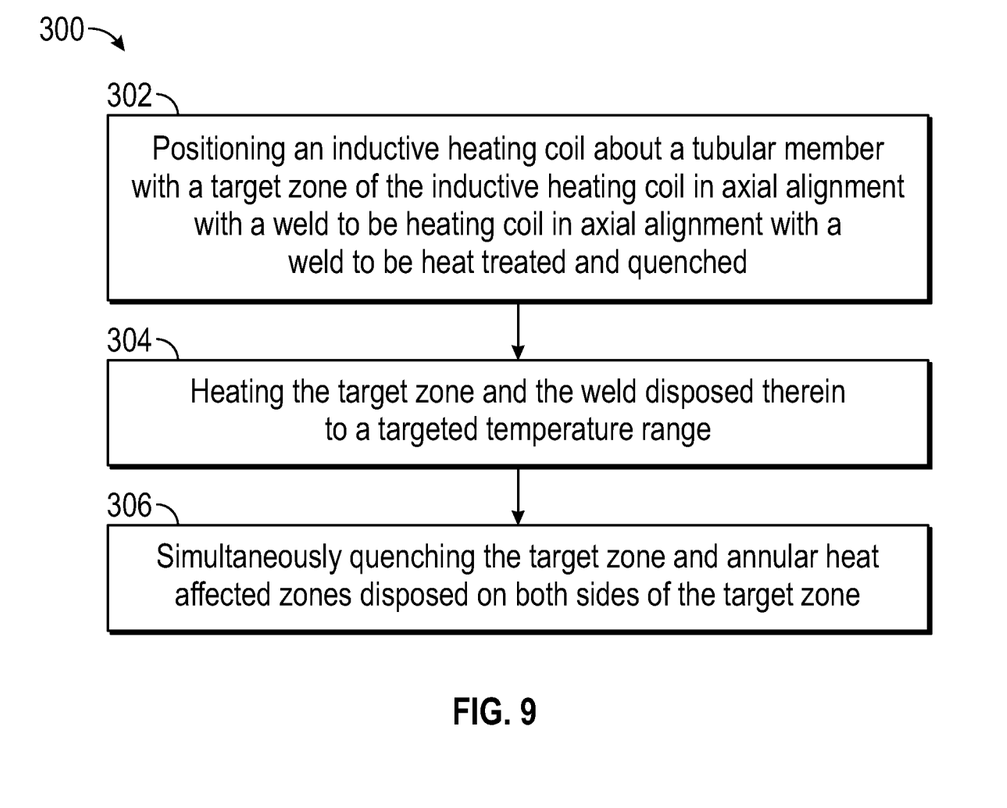
FIG. 9 is an embodiment of a method for heating and quenching a target region on a tubular member in accordance with the principles described herein.

Referring now to FIG. 9, a method 300 for heating and quenching a target region on a tubular member is shown. As an example, method 300 may utilize device 100 to heat treat and quench annular welded joint 202 and annular zones 152, 153A, 153B of pipe 102 previously described.

Starting at block 302, method 300 includes positioning an inductive heating coil about the tubular member and axially aligning the inductive heating coil with a welded joint along the tubular member. Next, at block 304, method 300 includes heating the welded joint and the target zone including the welded joint with the inductive heating coil axially aligned with the welded joint after block 302. Block 304 may include heating the welded joint and the target region to reach a temperature within a targeted temperature range. In some embodiments, block 304 comprises heating the target zone to an austenitizing temperature within the range 1625 to 1675° F.

Moving now to block 306, method 300 includes simultaneously quenching a first annular heat affected zone along the tubular member on a first lateral side of the target region with a first quench fluid and quenching a second annular heat affected zone along the tubular member on a second lateral side of the target region that is opposite the first lateral side of the target region with a second quench fluid after block 304 and while maintaining the axial alignment of the inductive coil, the welded joint, and the target region after block 302. In some embodiments, the quenching of block 306 is performed immediately after block 304 or is performed within 0.25 seconds after completing block 304. For example, quenching may occur after heating is completed and heating ring 110 is de-energized. In this embodiment, quenching in block 308 is performed by emitting a first quenching fluid from a first quenching ring fixably coupled to one side of the inductive coil and disposed about the tubular member, and emitting a second quenching fluid from a second quenching ring fixably coupled to the opposite side of the inductive coil and disposed about the tubular member. After block 302, the inductive heating coil, the quenching rings, and the tubular member are stationary relative to each other.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially. The recitation of identifiers such as (a), (b), (c); (1), (2), (3); etc. before operations in a method claim are not intended to and do not specify a particular order to the operations, but rather are used to simplify subsequent reference to such operations.

What is claimed is:

1. A device for heating and quenching a tubular member, the device having a central axis and comprising:
    a first quenching ring disposed about the central axis and configured to receive the tubular member, wherein the first quenching ring comprises:
        a first annular body having a radially inner side, a radially outer side, a first inner cavity radially positioned between the radially inner side and the radially outer side of the first annular body;
        a first fluid inlet in fluid communication with the first inner cavity;
        a first plurality of circumferentially-spaced fluid outlets extending from the first inner cavity to the radially inner side of the first annular body;
    a second quenching ring disposed about the central axis and configured to receive the tubular member, wherein the second quenching ring is axially spaced from the first quenching ring and comprises:
        a second annular body having a radially inner side, a radially outer side, and a second inner cavity radially positioned between the radially inner side and the radially outer side of the second annular body;
        a second fluid inlet in fluid communication with the second inner cavity;
        a second plurality of circumferentially-spaced fluid outlets extending from the second inner cavity to the radially inner side of the second annular body;

a heating ring disposed about the central axis and configured to receive the tubular member, wherein the heating ring is axially positioned between the first quenching ring and the second quenching ring, wherein the heating ring is fixably coupled to the first quenching ring and the second quenching ring, and wherein the heating ring includes an annular body comprising an induction coil configured to heat an annular target zone along the tubular member, wherein the annular target zone is beneath and within the heating ring radially between the heating ring and the tubular member, and wherein the target zone axially overlaps with the heating ring;

wherein the first quenching ring has an inner diameter, the second quenching ring has an inner diameter, and the annular body of the heating ring has an outer diameter, and wherein the outer diameter of the annular body of the heating ring is less than the inner diameter of the first quenching ring and less than the inner diameter of the second quenching ring;

wherein the first plurality of circumferentially-spaced fluid outlets are configured to direct and deliver a first quenching fluid to the target zone and a first annular heat affected zone extending axially from the target zone along the tubular member, and the second plurality of circumferentially-spaced fluid outlets are configured to direct and deliver a second quenching fluid to the target zone and a second annular heat affected zone extending axially from the target zone along the tubular member simultaneous with the delivery of the first quenching fluid.

2. The device of claim 1, wherein each of the first plurality of outlets is oriented at a first acute angle relative to a reference plane oriented perpendicular to the central axis; and wherein each of the second plurality of outlets is oriented at a second acute angle relative to the reference plane.

3. The device of claim 2, wherein the first acute angle is between 0° and 30° and the second acute angle is between 0° and 30°.

4. The device of claim 1, wherein the first quenching ring and the second quenching ring are axially spaced apart by an axial distance between 2.00 inches and 4.00 inches.

5. The device of claim 1, wherein the first plurality of outlets are arranged in a plurality of axially adjacent annular rows disposed about the central axis and the second plurality of outlets are arranged in a plurality of axially adjacent annular rows disposed about the central axis.

6. The device of claim 1, wherein the first plurality of outlets comprise at least 100 outlets and the second plurality of outlets comprise at least 100 outlets.

7. The device of claim 1, wherein each outlet is a hole having a diameter between 0.0625 and 0.1250 inches.

* * * * *